US007165026B2

(12) United States Patent
Acero et al.

(10) Patent No.: US 7,165,026 B2
(45) Date of Patent: Jan. 16, 2007

(54) METHOD OF NOISE ESTIMATION USING INCREMENTAL BAYES LEARNING

(75) Inventors: Alejandro Acero, Bellevue, WA (US); Li Deng, Redmond, WA (US); James G. Droppo, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 672 days.

(21) Appl. No.: 10/403,638

(22) Filed: Mar. 31, 2003

(65) Prior Publication Data

US 2004/0190732 A1 Sep. 30, 2004

(51) Int. Cl.
*G10L 15/00* (2006.01)
*G10L 21/00* (2006.01)

(52) U.S. Cl. ....................... 704/226; 704/228; 704/233

(58) Field of Classification Search ............... 381/94.1; 704/226, 228, 233

See application file for complete search history.

(56) References Cited

U.S. PATENT DOCUMENTS

| | | | | |
|---|---|---|---|---|
| 4,918,735 | A | 4/1990 | Morito | |
| 5,012,519 | A | 4/1991 | Adlersberg et al. | |
| 5,148,489 | A * | 9/1992 | Erell et al. | 704/226 |
| 5,604,839 | A | 2/1997 | Acero et al. | |
| 5,727,124 | A * | 3/1998 | Lee et al. | 704/233 |
| 5,924,065 | A | 7/1999 | Eberman et al. | |
| 6,092,045 | A | 7/2000 | Stubley et al. | |
| 6,343,267 | B1 | 1/2002 | Kuhn et al. | |
| 6,778,954 | B1 * | 8/2004 | Kim et al. | 704/226 |
| 6,944,590 | B1 | 9/2005 | Deng et al. | |
| 2003/0055640 | A1 | 3/2003 | Burshtein et al. | |
| 2003/0191637 | A1 | 10/2003 | Deng | |
| 2003/0216911 | A1 | 11/2003 | Deng et al. | |
| 2004/0064313 | A1 * | 4/2004 | Shimosakoda | 704/226 |
| 2004/0064314 | A1 * | 4/2004 | Aubert et al. | 704/233 |

OTHER PUBLICATIONS

Brendan, J. et al. ALGONQUIN: Iterating Laplace's Method to Remove Multiple Types of Acoustic Distortion for Robust Speech Recognition. Proc. of the Eurospeech Conference, Aalborg, Denmark. Sep. 2001.*

Gauvain, Jean-Luc et al. Maximum a Posteriori Estimation for Multivariate Gaussian Mixture Observations of Markov Chains. IEEE Transactions on Speech and Audio Processing, vol. 2, No. 2,pp. 291-298, Apr. 1994.*

Attias, Hagai et al. A New Method for Speech Denoising and Robust Speech Recognition Using Probabilistic Models for Clean Speech and for Noise. Proceedings Eurosppech, 2001, pp. 1903-1906.*

(Continued)

*Primary Examiner*—Vivian Chin
*Assistant Examiner*—Devona E. Faulk
(74) *Attorney, Agent, or Firm*—Steven M. Koehler; Westman, Champlin & Kelly, P.A.

(57) ABSTRACT

A method and apparatus estimate additive noise in a noisy signal using incremental Bayes learning, where a time-varying noise prior distribution is assumed and hyperparameters (mean and variance) are updated recursively using an approximation for posterior computed at the preceding time step. The additive noise in time domain is represented in the log-spectrum or cepstrum domain before applying incremental Bayes learning. The results of both the mean and variance estimates for the noise for each of separate frames are used to perform speech feature enhancement in the same log-spectrum or cepstrum domain.

10 Claims, 4 Drawing Sheets

OTHER PUBLICATIONS

Acero et al., "Recursive estimation of nonstationary noise using a nonlinear model with iterative stochastic approximation," Proc. ASRU Workshop, Trento, Italy, Dec. 2001, 4 pages.
Acero et al., "Log-domain speech feature enhancement using sequential MAP noise estimation and a phase-sensitive model of the acoustic environment," Proc. ICSLP, Denver CO, Sep. 2002, pp. 192-195.
Acero et al., "A Bayesian approach to speech feature enhancement using the dynamic cepstral prior," Proc. ICASSP, Orlando, Florida, May 2002, pp. 829-832.
Deng et al. "A nonlinear observation model for removing noise from corrupted speech log Mel-spectral energies," Proc. ICSLP, 2002, pp. 182-185.
Lee et al. "On-line adaptive learning of the continuous density HMM based on approximate recursive Bayes estimate," IEEE Trans. Speech Audio Proc., vol. 5, No. 2, Mar. 1997, pp. 161-172.
J. Spragins. "A note on the iterative application of Bayes' rule," IEEE Trans. Inform. Theory, vol. 11, No. 4, pp. 544-549.
Deng et al., "Recursive noise estimation using iterative stochastic approximation for stereo-based robust speech recognition", Proc. IEEE, Automatic Speech Recognition and Understanding, pp. 81-84, Dec. 9, 2001, XP002259233.
Huo et al., "On-line Adaptive Learning of the Continuous Density Hidden Markov Model Based on Approximate Recursive Bayes Estimate", Proc. IEEE, Speech and Audio Processing, vol. 5, No. 2, pp. 161-172, Mar. 2, 1997, XP000771954.
Droppo et al., "A Nonlinear Observation Model for Removing Noise From Corrupted Speech Log Mel-Specteral Energies", ICSLP 2002: 7th Int. Conf. On Spoken Language Processing, Denver, CO, Sep. 16-20, 2002, pp. 1569-1572, XP008025395.
U.S. Appl. No. 10/117,142, filed Apr. 5, 2002, James G. Droppo et al.
U.S. Appl. No. 09/668,764, filed Oct. 16, 2000, Li Deng et al.
U.S. Appl. No. 09/688,950, filed Oct. 16, 2000, Li Deng et al.
Gauvain et al. "Maximum a Posteriori Estimation for Multivariate Gaussian Mixture Observations of Markov Chains," Apr. 1994, IEEE Transactions on Speech and Audio Processing, vol. 2, No. 2, pp. 291-298.
Li Deng and Jeff Ma, "Spontaneous speech recognition using a statistical coarticulatory model for the vocal-tract-resonance dynamics," J. Acoust. Soc. Am. 108(5), Pt. 1, Nov. 2002.
Jeff Ma and Li Deng, "A path-stack algorithm for optimizing dynamic regimes in a statistical hidden dynamic model of speech," Computer speech and Language 2000, 00, 1-14.
"Learning Dynamic Noise Models From Noisy Speech for Robust Speech Recognition," Brendan J. Frey, et al., Neural Information Processing System Conference, 2001, pp. 1165-1121.
"Speech Denoising and Dereverberation Using Probabilistic Models," Hagai Attias, et al. , Advance in NIPS, vol. 13, 2000 pp. 758-764.
"Statistical-Model-Based Speech Enhancement Systems," Proc. of IEEE, vol. 80, No. 10, Oct. 1992, pp. 1526.
"HMM-Based Strategies for Enhancement of Speech Signals Embedded in Nonstationary Noise," Hossein Sameti, IEEE Trans. Speech Audio Processing, vol. 6, No. 5, Sep. 1998, pp. 445-455.
"Model-based Compensation of the Additive Noise for Continuous Speech Recognition," J.C. Segura, et al., Eurospeech 2001.
"Large-Vocabulary Speech Recognition Under Adverse Acoustic Environments," Li Deng, et al., Proc. ICSLP, vol. 3, 2000, pp. 806-809.
"A Compact Model for Speaker-Adaptive Training," Anastasakos, T., et al., BBN Systems and Technologies, pp. 1137-1140 (undated).
"Suppression of Acoustic Noise in Speech Using Spectral Subtraction," Boll, S. F., IEEE Transactions on Acoustics, Speech and Signal Processing, vol. ASSP-27, No. 2, pp. 113-120 (Apr. 1979).
"Experiments With a Nonlinear Spectral Subtractor (NSS) , Hidden Markov Models and the Projection, for Robust Speech Recognition in Cars," Lockwood, P. et al., Speech Communication 11, pp. 215-228 (1992).
"A Spectral Subtraction Algorithm for Suppression of Acoustic Noise in Speech," Boll, S.F., IEEE International Conference on Acoustics, Speech & Signal Processing, pp. 200-203 (Apr. 2-4, 1979).
"Enhancement of Speech Corrupted by Acoustic Noise," Berouti, M. et al., IEEE International Conference on Acoustics, Speech & Signal Processing, pp. 208-211 (Apr. 2-4, 1979).
"Acoustical and Environmental Robustness in Automatic Speech Recognition," Acero, A., Department of Electrical and Computer Engineering, Carnegie Mellon University, pp. 1-141 (Sep. 13, 1990).
"Speech Recognition in Noisy Environments," Pedro J. Moreno, Ph.D thesis, Carnegie Mellon University, 1996.
"A New Method for Speech Denoising and Robust Speech Recognition Using Probabilistic Models for Clean Speech and for Noise," Hagai Attias, et al., Proc. Eurospeech, 2001, pp. 1903-1906.
"HMM Adaptation Using Vector Taylor Series for Noisy Speech Recognition," Alex Acero, et al., Proc. ICSLP, vol. 3, 2000, pp. 869-872.
"Sequential Noise Estimation with Optimal Forgetting for Robust Speech Recognition," Mohomed Afify, et al., Proc. ICASSP, vol. 1, 2001, pp. 229-232.
"High-Performance Robust Speech Recognition Using Stereo Training Data," Li Deng, et al., Proc. ICASSP, vol. 1, 2001, pp. 301-304.
"ALGONQUIN: Iterating Laplace's Method to Remove Multiple Types of Acoustic Distortion for Robust Speech Recognition," Brendan J. Frey, et al., Proc. Eurospeech, Sep. 2001, Aalborg, Denmark.
"Nonstationary Environment Compensation Based on Sequential Estimation," Nam Soo Kim, IEEE Signal Processing Letters, vol. 5, 1998, pp. 57-60.
"On-line Estimation of Hidden Markov Model Parameters Based on the Kullback-Leibler Information Measure," Vikram Krishnamurthy, et al., IEEE Trans. Sig. Proc., vol. 41, 1993, pp. 2557-2573.
"A Vector Taylor Series Approach for Environment-Independent Speech Recognition," Pedro J. Moreno, ICASSP, vol. 1, 1996, pp. 733-736.
"Recursive Parameter Estimation Using Incomplete Data," D.M. Titterington, J. J. Royal Stat. Soc., vol. 46(B), 1984, pp. 257-267.
"The Aurora Experimental Framework for the Performance Evaluations of Speech Recognition Systems Under Noisy Conditions," David Pearce, et al., Proc. ISCA IIRW ASR 2000, Sep. 2000.
"Efficient On-Line Acoustic Environment Estimation for FCDCN in a Continuous Speech Recognition System," Jasha Droppo, et al., ICASSP, 2001.
"Robust Automatic Speech Recognition With Missing and Unreliable Acoustic Data," Martin Cooke, Speech Communication, vol. 34, No. 3, pp. 267-285, Jun. 2001.
Moreno P.J. et al, "A vector Taylor series 1-19 approach for environment-independent speech recognition", 1996 IEEE International Conference On Acoustics, Speech, and Signal Processing Conference Proceedings, 1996 IEEE International Conference On Acoustics, Speech, and Signal Processing Conference Proceedings, Atlanta, GA, pp. 733-736, vol. 2, 1996, New York, NY.
J. Droppo, L. Deng, and A. Acero. "Evaluation of the SPLICE algorithm on the Aurora2 database," *Proc. Eurospeech*, Sep. 2001, pp. 217-220.
J. Droppo, A. Acero, and L. Deng, "Uncertainty decoding with SPLICE for noise robust speech recognition," in *Proc. 2002 ICASSP*, Orlando, Florida, May 2002.
Kristjansson T. et al, "Towards non-stationary model-based noise adaptation for large vocabulary speech recognition" 2001 IEEE International Conference on Acoustics, Speech, and Signal Processing, May 7-11, 2001, pp. 337-340, vol. 1.
L. Deng, J. Droppo and A. Acero: "Log-domain speech feature enhancement using sequential map noise estimation and a phase-sensitive model of the acoustic environment", Proceedings ICSLP 2002, Sep. 16-20, 2002, pp. 1813-1816.
N.B. Yoma, F.R. McInnes, and M.A. Jack, "Improving performance of spectral substraction in speech recognition using a model for additive noise," IEEE Trans. On Speech and Audio Processing, vol. 6, No. 6, pp. 579-582, Nov. 1998.

Y.Zhao, "Frequency-domain maximum likelihood estimation for automatic speech recognition in additive and convolutive noises," IEEE Trans. Speech and Audio Proc., vol. 8, No. 3, pp. 255-266, May 2000.

H.Y. Jung et al., "On the temporal decorrelation of feature parameters for noise-robust speech recognition," in Proc. 2000 ICASSP, May 2000, vol. 8, pp. 407-416.

Y. Ephraim et al, "On second-order statistics and linear estimation of cepstral coefficients," IEEE Trans. Speech and Audio Proc., vol. 7, No. 2, pp. 162-176, Mar. 1999.

F.H.Liu, et al., "Environment normalization for robust speech recognition using direct cepstral comparison," in Proc. 1994 IEEE ICASSP, Apr. 1994.

A.Acero et al., "Environmental robustness in automatic speech recognition," in Proc. 1990 ICASSP, Apr. 1990, vol. 2, pp. 849-552.

A.Acero et al., "Robust speech recognition by normalization of the acoustic space," in Proc. 1991 IEEE ICASSP, Apr. 1991, vol. 2, pp. 893-896.

P. Green et al, "Robust ASR based on clean speech models: An evaluation of missing data techniques for connected digit recognition in noise," in Proc. Eurospeech 2001, Aalborg, Denmark, Sep. 2001, pp. 213-216.

* cited by examiner

METHOD OF NOISE ESTIMATION USING INCREMENTAL BAYES LEARNING

BACKGROUND OF THE INVENTION

The present invention relates to noise estimation. In particular, the present invention relates to estimating noise in signals used in pattern recognition.

A pattern recognition system, such as a speech recognition system, takes an input signal and attempts to decode the signal to find a pattern represented by the signal. For example, in a speech recognition system, a speech signal (often referred to as a test signal) is received by the recognition system and is decoded to identify a string of words represented by the speech signal.

Input signals are typically corrupted by some form of noise. To improve the performance of the pattern recognition system, it is often desirable to estimate the noise in the noisy signal.

In the past, some frameworks have been used to estimate the noise in a signal. In one framework, batch algorithms are used that estimate the noise in each frame of the input signal independent of the noise found in other frames in the signal. The individual noise estimates are then averaged together to form a consensus noise value for all of the frames. In a second framework, a recursive algorithm is used that estimates the noise in the current frame based on noise estimates for one or more previous or successive frames. Such recursive techniques allow for the noise to change slowly over time.

In one recursive technique, a noisy signal is assumed to be a non-linear function of a clean signal and a noise signal. To aid in computation, this non-linear function is often approximated by a truncated Taylor series expansion, which is calculated about some expansion point. In general, the Taylor series expansion provides its best estimates of the function at the expansion point. Thus, the Taylor series approximation is only as good as the selection of the expansion point. Under the prior art, however, the expansion point for the Taylor series was not optimized for each frame. As a result, the noise estimate produced by the recursive algorithms has been less than ideal.

Maximum-likelihood (ML) and maximum a posteriori (MAP) techniques have been used for sequential point estimation of nonstationary noise using an iteratively linearized nonlinear model for the acoustic environment. Generally, using a simple Gaussian model for the distribution of noise, the MAP estimate provided a better quality of the noise estimate. However, in the MAP technique, the mean and variance parameters associated with the Gaussian noise prior are fixed from a segment of each speech-free test utterance. For nonstationary noise, this approximation may not properly reflect realistic noise prior statistics.

In light of this, a noise estimation technique is needed that is more effective at estimating noise in pattern signals.

SUMMARY OF THE INVENTION

A new approach to estimating nonstationary noise uses incremental Bayes learning. In one aspect, this technique can be defined as assuming a time-varying noise prior distribution where the noise estimate, which can be defined by hyperparameters (mean and variance), are updated recursively using an approximation posterior computed at a preceding time or frame step. In another aspect, this technique can be defined as for each frame successively, estimating the noise in each frame such that a noise estimate for a current frame is based on a Gaussian approximation of data likelihood for the current frame and a Gaussian approximation of noise in a sequence of prior frames.

DETAILED DESCRIPTION OF ILLUSTRATIVE EMBODIMENTS

Figure 1:
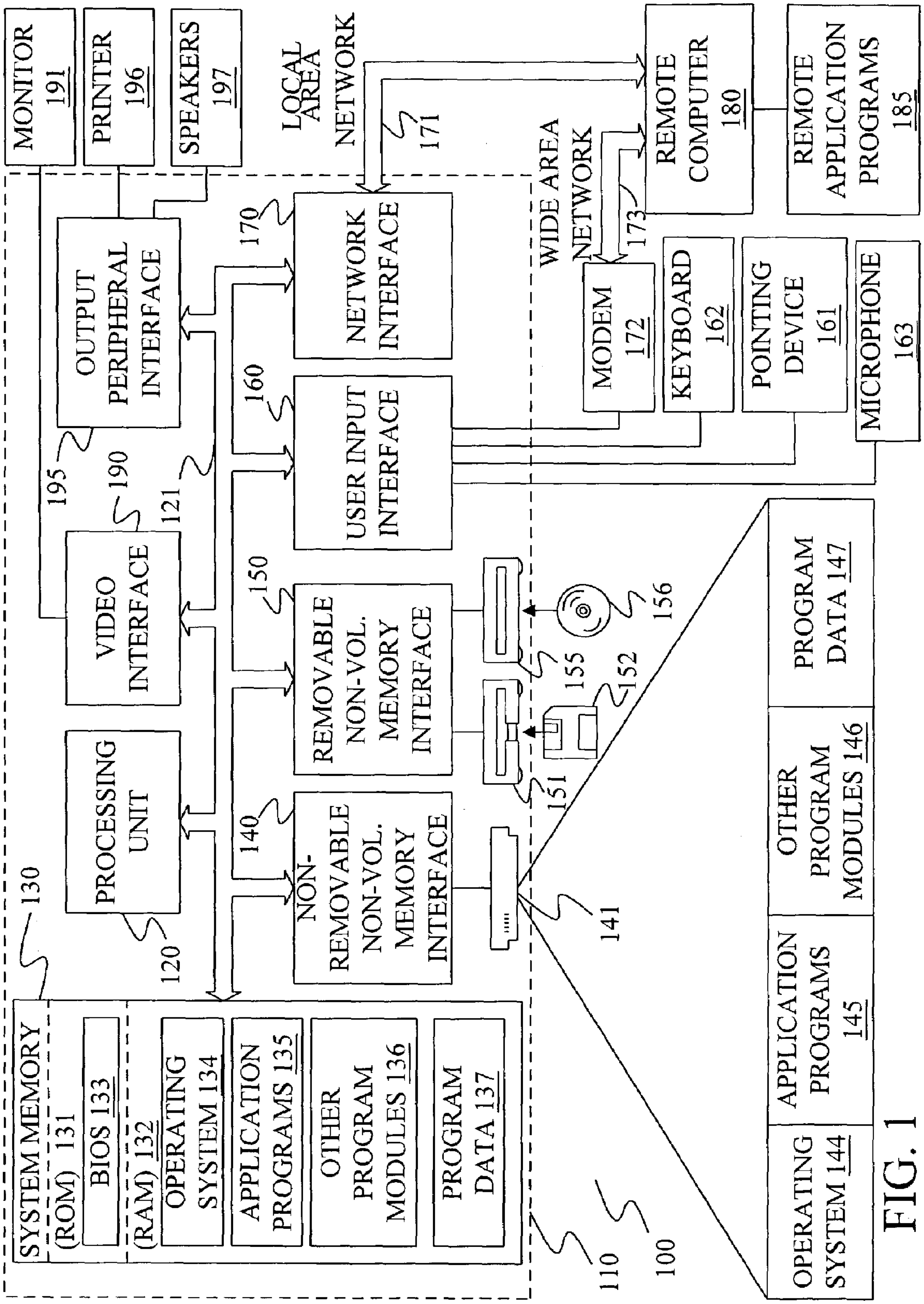
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Tasks performed by the programs and modules are described below and with the aid of figures. Those skilled in the art can implement the description and/or figures herein as computer-executable instructions, which can be embodied on any form of computer readable media discussed below.

The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
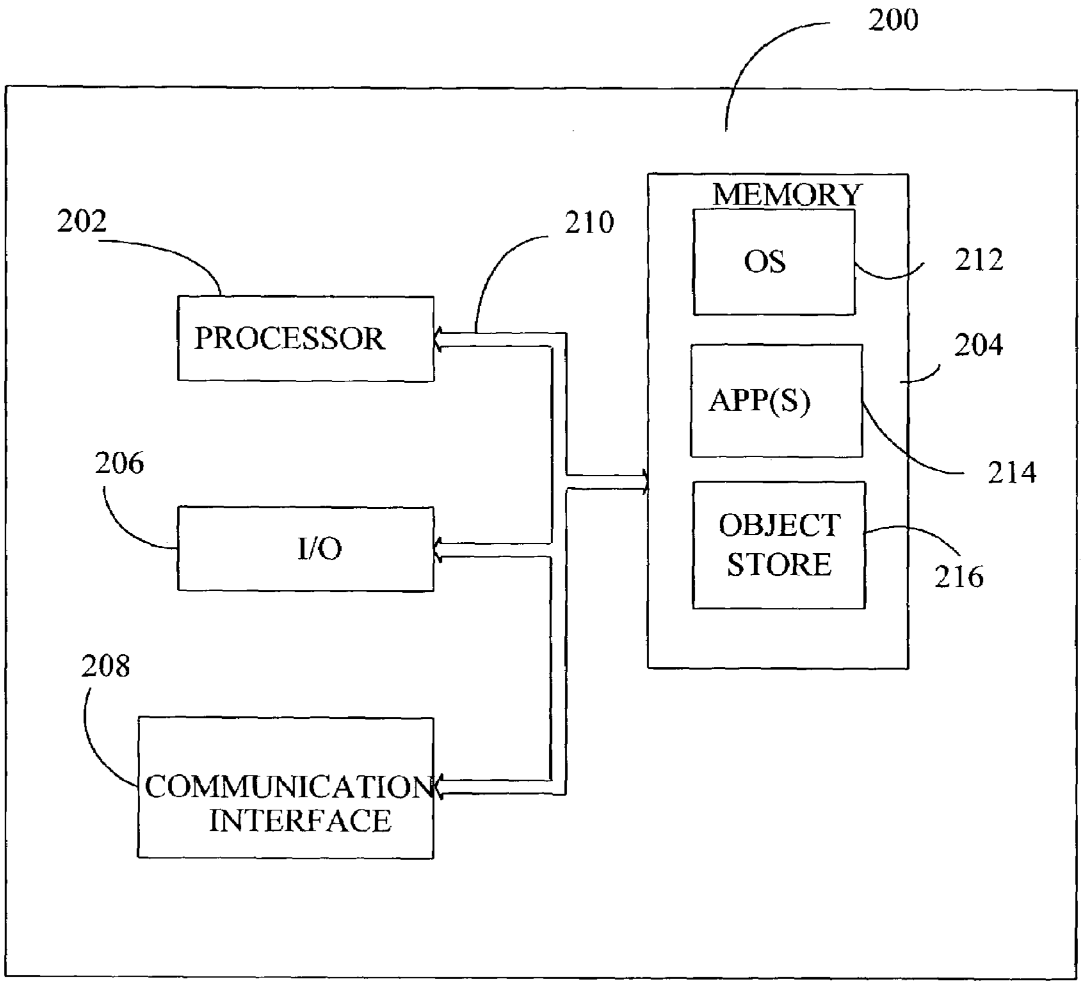
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Under one aspect of the present invention, a system and method are provided that estimate noise in pattern recognition signals. To do this, the present invention uses a recursive algorithm to estimate the noise at each frame of a noisy signal based in part on a noise estimate found for at least one neighboring frame. Under the present invention, the noise estimate for a single frame by using incremental Bayes learning, where a time-varying noise prior distribution is assumed and a noise estimate is updated recursively using an approximation for posterior noise computed at a previous frame. Through this recursive process, the noise estimate can track nonstationary noise.

Let $y_1^t = y_1, y_2, \ldots, y_\tau, \ldots, y_t$ be a sequence of noisy speech observation data, expressed in the log domain (such as log-spectra or cepstra), and are assumed to be scalar-valued without loss of generality. Data $y_1^t$ are used to sequentially estimate the corrupting noise sequence $n_1^t = n_1, n_2, \ldots, \ldots, n_t$, with the same data length t. Within the Bayesian learning framework, it is assumed that the knowledge about noise n (treated as an unknown parameter) is contained in a given a-priori distribution of p(n). If the noise sequence is stationary, i.e., the statistical properties of the noise do not change over time, then the conventional Bayes inference (i.e., computing the posterior) on noise parameter n at any time can be accomplished via the "batch-mode" Bayes' rule:

$$p(n \mid y_1^t) = \frac{p(y_1^t \mid n)p(n)}{\int_\Theta p(y_1^t \mid n)p(n)dn},$$

where Θ is an admissible region of the noise parameter space. Given $p(n|y_1^t)$ any estimate on noise n is possible in principle. For example, a conventional MAP point estimate on noise n is computed as a global or local maximum of the posterior $p(n|y_1^t)$. The minimum mean square error (MMSE) estimate is the expectation over the posterior $p(n|y_1^t)$.

However, when the noise sequence is nonstationary and the training data of noisy speech $y_1^t$ is presented sequentially as in most practical speech feature enhancement applications, new noise estimation techniques are needed in order to track the noise statistics that is changing over time. In an iterative application, Bayes' rule can be written as:

$$p(n_t \mid y_1^t) = \frac{1}{C_t} p(y_t \mid y_1^{t-1}, n_t)p(n_t \mid y_1^{t-1}),$$

$$\text{where } C_t = p(y_1^t \mid y_1^{t-1}) = \int_\Theta p(y_t \mid y_1^{t-1}, n_t)p(n_t \mid y_1^{t-1})dn_t.$$

Assuming conditional independency between noisy speech $y_t$ and its past $y_1^{t-1}$ given $n_t$, or $P(y_t|y_1^{t-1}, n_t) = p(y_t|n_t)$, and assuming smoothness in the posterior: $p(n_t|y_1^{t-1}) \approx p(n_{t-1}|y_1^{t-1})$, the previous equation can be written as:

$$p(n_t \mid y_1^t) \approx \frac{1}{C_t} p(y_t \mid n_t)p(n_{t-1} \mid y_1^{t-1}). \quad (1)$$

Incremental learning of nonstationary noise can now be established by repeated use of Eq. 1 as follows. Initially, in absence of noisy speech data y, the posterior PDF comes from the known prior $p(n_0|y_0) = p(n_0)$, where $p(n_0)$ is obtained from the analysis of known noise only frames and assumed Gaussian. Then use of Eq. 1 for t=1 produces:

$$p(n_1 \mid y_1) \approx \frac{1}{C_1} p(y_1 \mid n_1)p(n_0), \quad (2)$$

and for $t = 2$ it produces:

$$p(n_2 \mid y_1, y_2) \approx \frac{1}{C_2} p(y_2 \mid n_2)p(n_1 \mid y_1),$$

using the $p(n_1|y_1)$ already computed from Eq. 2. For t=3, Eq. 1 becomes:

$$p(n_3 \mid y_1^3) \approx \frac{1}{C_3} p(y_3 \mid n_3)p(n_2 \mid y_1, y_2),$$

and so on. This process thus recursively generates a sequence of posteriors (provided that $p(y_t|n_t)$ is available):

$$p(n_1|y_1), p(n_2|y_1^2), \ldots, p(n_{96}|y_1^{96}), \ldots, p(n_t|y_1^t), \quad (3)$$

which provides a basis for making incremental Bayes' inference on the nonstationary noise sequence $n_1^t$. The general principle of incremental Bayes' inference discussed so far will now be applied to a specific acoustic distortion model, which supplies the framewise data PDF $p(y_t|n_t)$, and under the simplifying assumption that the noise prior be Gaussian.

Figure 3:
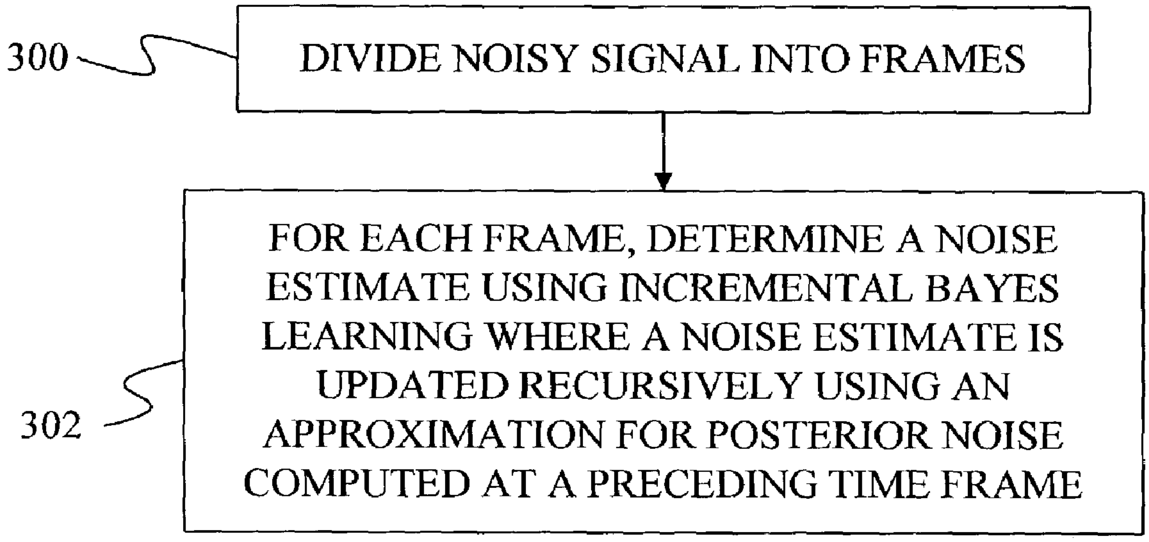
FIG. 3 is a flow diagram of a method of estimating noise under one embodiment of the present invention.

As applied to the noise, incremental Bayes learning updates the current "prior" distribution about noise using the posterior given the observed data up to the most recent past, since this posterior is the most complete information about the parameter preceding the current time. This method is illustrated in FIG. 3 where in a first step a noisy signal 300 is divided frames. At step 302, for each frame incremental Bayes learning is applied where a noise estimate of each frame assumes a time-varying noise prior distribution and the noise estimate is updated recursively using an approximation for posterior noise computed at a previous time frame. Therefore, the posterior sequence in Eq. 3 becomes a time-varying prior sequence (i.e., prior evolution) for noise distributional parameters of interest (with the time shift of one frame in size). In one embodiment, step 302 can include calculating the data likelihood $p(y_t|n_t)$ for the current frame, while using a noise estimate in a preceding frame, preferably the immediately preceding frame, which assumes smoothness in the posterior as indicated by Eq. 1.

For data likelihood $p(y_t|n_t)$, which is non-Gaussian (and will be described shortly), the posterior is necessarily non-Gaussian. A successive application of Eq. 1 would result in a fast expanding combination of the previous posteriors and lead to intractable forms. Approximations are needed to overcome the intractability. The approximation that is used is to apply the first-order Taylor series expansion to linearize the nonlinear relationship between $y_t$ and $n_t$. This leads to a Gaussian form of $p(y_t|n_t)$. Therefore, the time-varying noise prior PDF $p(n_{\tau+1})$, which is inherited from the posterior for the past data history $p(n_\tau|y_1^\tau)$, can be approximated by the Gaussian:

$$p(n_\tau \mid y_1^\tau) = \frac{1}{(2\pi)^{1/2}\sigma_{n_\tau}} \exp\left[-\frac{1}{2}\left(\frac{n_\tau - \mu_{n_\tau}}{\sigma_{n_\tau}}\right)^2\right] \doteq N[n_\tau; \mu_{n_\tau}, \sigma_{n_\tau}^2], \tag{4}$$

where $\mu_{n\tau}$ and $\sigma_{n\tau}^2$ are called the hyperparameters (mean and variance) that characterize the prior PDF. Then the posterior sequence in Eq. 3 computed from recursive Bayes' rule Eq. 1 offers a principled way of determining the temporal evolution of the hyperparameters, which is described below.

The acoustic-distortion and clean-speech models for computing data likelihood $p(y_t|n_t)$ will now be provided. First assume a time-invariant mixture-of-Gaussian model for log-spectra of clean speech $\chi$:

$$p(x) = \sum_m p(m)N[x; \mu_x(m), \sigma_x^2(m)]. \tag{5}$$

A simple nonlinear acoustic-distortion model in the log-spectral domain can then be used:

$$\exp(y)=\exp(x)+\exp(n),\text{ or } y=x+g(n-x) \tag{6}$$

where the nonlinear function is:

$$g(z)=\log\,[1+\exp(z)].$$

In order to obtain a useful form for the data likelihood $p(y_t|n_t)$, a Taylor series expansion is used to linearize nonlinearity g in Eq. 6. This gives the linearized model of $$y \approx x+g(n_0-\mu_x(m_0))+g'(n_0-\mu_x(m_0))(n-n_0), \tag{7}$$

where $n_0$ is the Taylor series expansion point and the first-order series expansion coefficient can be easily computed as:

$$g'(n_0 - \mu_x(m_0)) = \frac{\exp(n_0)}{\exp[\mu_x(m_0)] + \exp(n_0)}.$$

In evaluating functions g and g' in Eq. 7, the clean speech value $\chi$ is taken as the mean ($\mu_\chi(m_0)$) of the "optimal" mixture Gaussian component $m_0$.

Eq. 7 defines a linear transformation from random variables $\chi$ to y (after fixing n). Based on this transformation, we obtain the PDF on y below from the PDF on $\chi$ (Eq. 5) with a Laplace approximation:

$$p(y_t \mid n_t) = \sum_m p(m)N[y_t; \mu_y(m, t), \sigma_y^2(m, t)] \approx N[y_t; \mu_y(m_0, t), \sigma_y^2(m_0, t)], \tag{8}$$

where the optimal mixture component is determined by $$m_0 = \arg\max_m N[y_t; \mu_y(m, t), \sigma_y^2(m, t)],$$

and where the mean and variance of the approximate Gaussians are $$\mu_y(m_0, t)=\mu_x(m_0)+g_{m_0}+g'_{m_0}\times(n_t-n_0)\sigma_y^2(m_0,t)=\sigma_x^2(m_0)+g'^2_{m_0}\sigma_{n_t}^2. \tag{9}$$

As will be shown below, the Gaussian estimate for $p(y_t|n_t)$ is used to develop that algorithm. Although the foregoing used a Taylor series expansion and Laplace approximation to provide a Gaussain estimate for $p(y_t|n_t)$, it should be understood that other techniques can be used to provide a Gaussian estimate without departing from the present invention. For example, besides using a Laplace approximation in Eq. 8, numerical techniques for approximation or a Gaussian mixture model (with a small number of components) can be used.

An algorithm for estimating time-varying mean and variance in the noise prior can now be provided. Given the approximate Gaussian form for $p(y_t|n_t)$ as in Eq. 8 and for $p(n_\tau|y_1^\tau)$ as in Eq. 4, the algorithm for determining noise prior evolution, expressed as sequential estimates of time-varying hyperparameters of mean $\mu_{n\tau}$ and variance $\sigma_{n\tau}^2$ can be provided. Substituting Eqs. 4 and 8 into Eq. 1, the following can be obtained:

$$N(n_t;\mu_{n_t},\sigma_{n_t}^2)\propto N[y_t;\mu_y(m_0, t),\sigma_y^2(m_0,t)]N(n_{t-1};\mu_{n_{t-1}},\sigma_{n_{t-1}}^2)\approx N[g'_{m_0}n_{t-1};\mu_1,\sigma_y^2(m_0,t)]N(n_{t-1};\mu_{n_{t-1}},\sigma_{n_{t-1}}^2) \tag{10}$$

where $\mu_1=y_t-\mu_x(m_0)-g_{m0}+g'_{m0}n_0$, and the assumption of noise smoothness was used. The means and variances, respectively, of the left and right hand sides are matched in Eq. 10 to obtain the prior evolution formulas:

$$\mu_{n_t} = \frac{g'_{m_0}\,\overline{\mu}_1\,\sigma_{n_{t-1}}^2 + \mu_{n_{t-1}}\sigma_y^2(m_0, t-1)}{g'^2_{m_0}\sigma_{n_{t-1}}^2 + \sigma_y^2(m_0, t-1)}, \tag{11}$$

-continued $$\sigma_{n_t}^2 = \frac{\sigma_y^2(m_0, t-1)\sigma_{n_{t-1}}^2}{g_{m_0}'^2\sigma_{n_{t-1}}^2 + \sigma_y^2(m_0, t-1)},$$

where $\bar{\mu}_1 = y_t - \mu_x(m_0) - g_{m0} + g'_{m0}\mu_{nt-1}$. In establishing Eq. 11, the previous time' prior mean as the Taylor series expansion point for noise; i.e. $n_0 = \mu_{n_{t-1}}$ is used. The well established result in Gaussian computation (setting $a_1 = g'_{m0}$) was also used:

$$\mathcal{N}(ax; \mu_1, \sigma_1^2)\mathcal{N}(x; \mu_2, \sigma_2^2) = \frac{1}{2\pi\sigma_1\sigma_2}\exp\left[-\frac{1}{2}\left(\frac{x-\mu}{\sigma}\right)^2 + K\right],$$

where $$\mu = \frac{a\mu_1\sigma_2^2 + \mu_2\sigma_1^2}{a^2\sigma_2^2 + \sigma_1^2}; \quad \sigma^2 = \frac{\sigma_1^2\sigma_2^2}{a^2\sigma_2^2 + \sigma_1^2}.$$

Based on a set of simplified yet effective assumptions, approximate recursive Bayes' rule quadratic term matching are used to successfully derive the noise prior evolution formulas as summarized in Eq. 11. The mean noise estimate has been found to be more accurate measured by RMS error reduction, while the variance information can be used to provide a measure of reliability.

The noise estimation techniques described above may be used in a noise normalization technique or noise removal such as discussed in a patent application entitled METHOD OF NOISE REDUCTION USING CORRECTION VECTORS BASED ON DYNAMIC ASPECTS OF SPEECH AND NOISE NORMALIZATION, application Ser. No. 10/117,142, filed Apr. 5, 2002. The invention may also be used more directly as part of a noise reduction system in which the estimated noise identified for each frame is removed from the noisy signal to produce a clean signal such as described in patent application entitled NON-LINEAR OBSERVATION MODEL FOR REMOVING NOISE FROM CORRUPTED SIGNALS, application Ser. No. 10/237,163, filed on Sep. 6, 2002.

Figure 4:
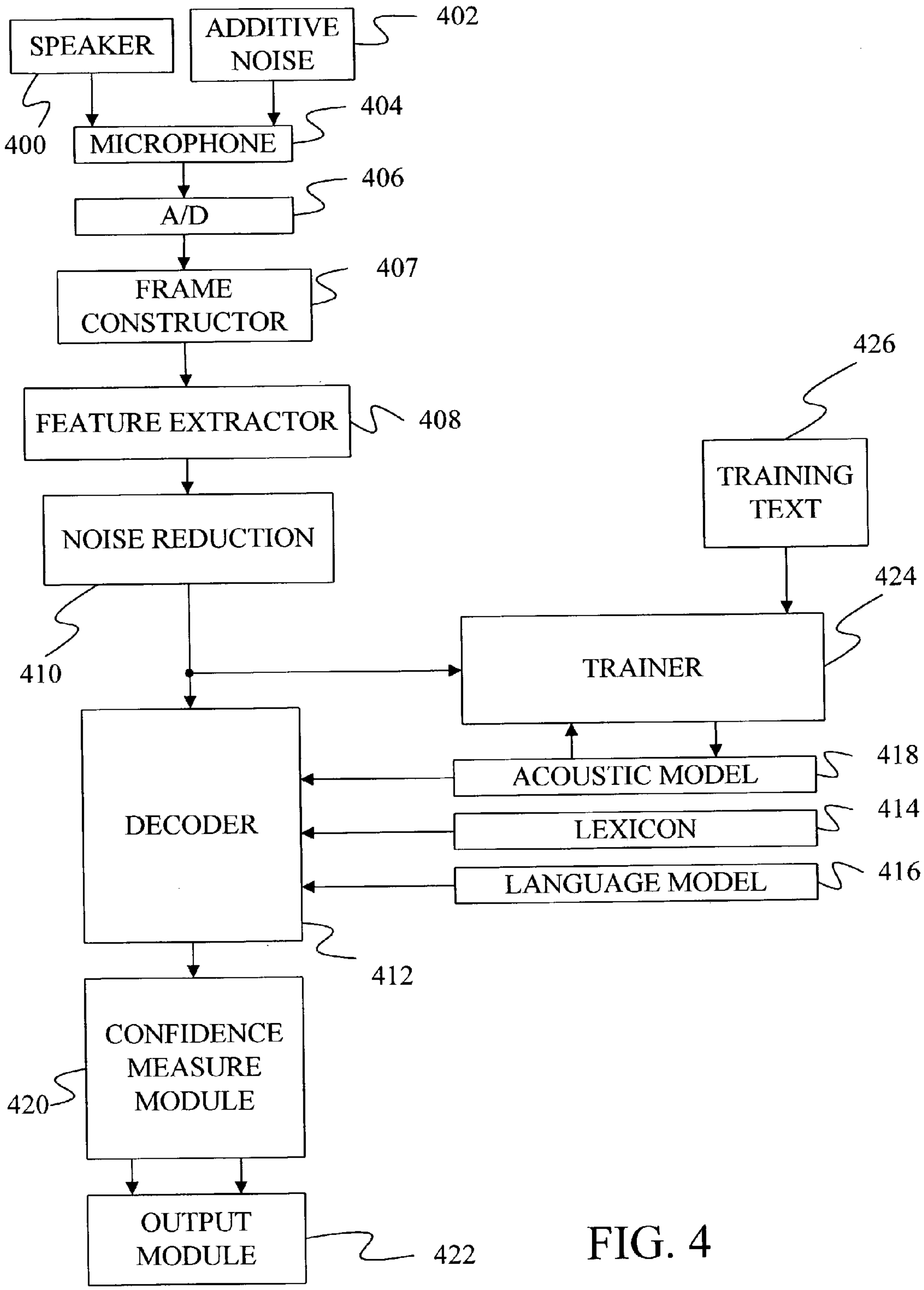
FIG. 4 is a block diagram of a pattern recognition system in which the present invention may be used.

FIG. 4 provides a block diagram of an environment in which the noise estimation technique of the present invention may be utilized to perform noise reduction. In particular, FIG. 4 shows a speech recognition system in which the noise estimation technique of the present invention can be used to reduce noise in a training signal used to train an acoustic model and/or to reduce noise in a test signal that is applied against an acoustic model to identify the linguistic content of the test signal.

In FIG. 4, a speaker 400, either a trainer or a user, speaks into a microphone 404. Microphone 404 also receives additive noise from one or more noise sources 402. The audio signals detected by microphone 404 are converted into electrical signals that are provided to analog-to-digital converter 406.

Although additive noise 402 is shown entering through microphone 404 in the embodiment of FIG. 4, in other embodiments, additive noise 402 may be added to the input speech signal as a digital signal after A-to-D converter 406.

A-to-D converter 406 converts the analog signal from microphone 404 into a series of digital values. In several embodiments, A-to-D converter 406 samples the analog signal at 16 kHz and 16 bits per sample, thereby creating 32 kilobytes of speech data per second. These digital values are provided to a frame constructor 407, which, in one embodiment, groups the values into 25 millisecond frames that start 10 milliseconds apart.

The frames of data created by frame constructor 407 are provided to feature extractor 408, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module produces a stream of feature vectors that are each associated with a frame of the speech signal. This stream of feature vectors is provided to noise reduction module 410, which uses the noise estimation technique of the present invention to estimate the noise in each frame.

The output of noise reduction module 410 is a series of "clean" feature vectors. If the input signal is a training signal, this series of "clean" feature vectors is provided to a trainer 424, which uses the "clean" feature vectors and a training text 426 to train an acoustic model 418. Techniques for training such models are known in the art and a description of them is not required for an understanding of the present invention.

If the input signal is a test signal, the "clean" feature vectors are provided to a decoder 412, which identifies a most likely sequence of words based on the stream of feature vectors, a lexicon 414, a language model 416, and the acoustic model 418. The particular method used for decoding is not important to the present invention and any of several known methods for decoding may be used.

The most probable sequence of hypothesis words is provided to a confidence measure module 420. Confidence measure module 420 identifies which words are most likely to have been improperly identified by the speech recognizer, based in part on a secondary acoustic model(not shown). Confidence measure module 420 then provides the sequence of hypothesis words to an output module 422 along with identifiers indicating which words may have been improperly identified. Those skilled in the art will recognize that confidence measure module 420 is not necessary for the practice of the present invention.

Although FIG. 4 depicts a speech recognition system, the present invention may be used in any pattern recognition system and is not limited to speech.

Although the present invention has been described with reference to particular embodiments, workers skilled in the art will recognize that changes may be made in form and detail without departing from the spirit and scope of the invention.

What is claimed is:

1. A method for estimating noise in a noisy signal, the method comprising:

dividing the noisy signal into frames; and determining a noise estimate, including both a mean and a variance, for a frame using incremental Bayes learning, where a time-varying noise prior distribution is assumed and a noise estimate is updated recursively using an approximation for posterior noise computed at a preceding frame, wherein determining a noise estimate comprises:

determining a noise estimate for a first frame of the noisy signal using an approximation for posterior noise computed at a preceding frame;

determining a data likelihood estimate for a second frame of the noisy signal; and using the data likelihood estimate for the second frame and the noise estimate for the first frame to determine a noise estimate for the second frame.

2. The method of claim 1 wherein determining the data likelihood estimate for the second frame comprises using the data likelihood estimate for the second frame in an equation that is based in part on a definition of the noisy signal as a non-linear function of a clean signal and a noise signal.

3. The method of claim 2 wherein the equation is further based on an approximation to the non-linear function.

4. The method of claim 3 wherein the approximation equals the non-linear function at a point defined in part by the noise estimate for the first frame.

5. The method of claim 4 wherein the approximation is a Taylor series expansion.

6. The method of claim 5 wherein the approximation further comprises taking a Laplace approximation.

7. The method of claim 1 wherein using the data likelihood estimate for the second frame comprises using the noise estimate for the first frame as an expansion point for a Taylor series expansion of a non-linear function.

8. The method of claim 1 wherein using an approximation for posterior noise comprises using a Gaussian approximation.

9. The method of claim 1 wherein each noise estimate is based on a Gaussian approximation.

10. The method of claim 9 wherein determining the noise estimate comprises determining a noise estimate for each frame successively.

* * * * *